United States Patent
Maresh et al.

(10) Patent No.: US 11,222,105 B2
(45) Date of Patent: Jan. 11, 2022

(54) GRAPHIC COLOR-BASED AUTHENTICATION

(71) Applicant: International Business Machines Corporation, Armonk, NY (US)

(72) Inventors: Mark Maresh, Wake, NC (US); Colm Nolan, Navan (IE); Juan F. Vargas, Cary, NC (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 276 days.

(21) Appl. No.: 16/217,733

(22) Filed: Dec. 12, 2018

(65) Prior Publication Data
US 2020/0193008 A1    Jun. 18, 2020

(51) Int. Cl.
*G06F 21/36*    (2013.01)
*G06T 11/00*    (2006.01)
(Continued)

(52) U.S. Cl.
CPC ............ *G06F 21/36* (2013.01); *G06T 11/001* (2013.01); *G06F 3/0482* (2013.01); *G06F 3/04845* (2013.01)

(58) Field of Classification Search
CPC .... G06F 21/36; G06F 3/0482; G06F 3/04845; G06T 11/001
See application file for complete search history.

(56) References Cited

U.S. PATENT DOCUMENTS 5,465,084 A    11/1995   Cottrell
6,118,872 A     9/2000   Kashima et al.
(Continued)

FOREIGN PATENT DOCUMENTS

EP    0677801 A1    10/1995

OTHER PUBLICATIONS

Ming Jiang • Ai He • Kuangyu Wang • Zhengyi Le; Two-Way Graphic Password for Mobile User Authentication; 2015 IEEE 2nd International Conference on Cyber Security and Cloud Computing (pp. 476-481); (Year: 2015).*

(Continued)

*Primary Examiner* — Jahangir Kabir
*Assistant Examiner* — Chao Wang
(74) *Attorney, Agent, or Firm* — Cantor Colburn LLP; Tihon Poltavets

(57) ABSTRACT

An example method includes enabling, by the user processing system, a user to associate a color with at least one of the plurality of pixels of a graphic, and generating a passcode. The passcode is based at least in part on the color associated with the at least one of the plurality of pixels. The method further includes transmitting, by the user processing system, the passcode to a host processing system. The method further includes determining, by the host processing system, whether the passcode matches an expected passcode that is based at least in part on a reference graphic comprising a plurality of reference pixels, each of the plurality of reference pixels having a color or a null value associated therewith. The method further includes, responsive to determining that the passcode matches the expected passcode, authorizing, by the host processing system, the user processing system to access a restricted resource.

17 Claims, 18 Drawing Sheets

(51) Int. Cl.
*G06F 3/0484* (2013.01)
*G06F 3/0482* (2013.01)

(56) References Cited

U.S. PATENT DOCUMENTS

| | | | |
|---|---|---|---|
| 6,686,931 B1 | 2/2004 | Bodnar | |
| 7,844,825 B1 | 11/2010 | Neginsky | |
| 8,145,912 B2 | 3/2012 | McLean | |
| 9,258,123 B2 | 2/2016 | Griffin et al. | |
| 10,848,482 B1 * | 11/2020 | Eisen | H04L 63/0853 |
| 2004/0034801 A1 | 2/2004 | Jaeger | |
| 2006/0045361 A1 * | 3/2006 | Yokose | H04N 21/26613 |
| | | | 382/232 |
| 2006/0174339 A1 * | 8/2006 | Tao | G06F 21/36 |
| | | | 726/18 |
| 2010/0287382 A1 * | 11/2010 | Gyorffy | G06F 21/36 |
| | | | 713/185 |
| 2010/0333197 A1 * | 12/2010 | Wang | G06F 21/36 |
| | | | 726/19 |
| 2011/0109620 A1 * | 5/2011 | Hong | H04N 13/15 |
| | | | 345/419 |
| 2013/0268775 A1 * | 10/2013 | Hawkins | G06F 21/602 |
| | | | 713/189 |
| 2015/0046993 A1 | 2/2015 | Arceo | |
| 2015/0213257 A1 * | 7/2015 | Lai | H04L 63/168 |
| | | | 726/6 |
| 2017/0078278 A1 * | 3/2017 | Hong | H04L 63/0838 |
| 2017/0134372 A1 * | 5/2017 | Dube | G06K 9/4652 |

OTHER PUBLICATIONS

Priyanka Mane • Poonam Desale; A Novel Approaches for Visual Authentication Protocols; 2018 3rd International Conference on Inventive Computation Technologies (ICICT) (pp. 182-184); (Year: 2018).*

Manish M. Potey • C. A. Dhote • Deepak H. Sharma; Secure authentication for data protection in cloud computing using color schemes; 2016 International Conference on Computation System and Information Technology for Sustainable Solutions (CSITSS) (pp. 424-427); (Year: 2016).*

Chalkias et al., "A Multi-Grid Graphical Password Scheme," Proceedings of the 6th International Conference on Artificial Intelligence and Digital Communications, Thessaloniki, Greece, 2006, pp. 80-90.

Tan et al., "Spy-Resistant Keyboard: More Secure Password Entry on Public Touch Screen Displays," Proceedings of the 17th Australia Conference on Computer-Human Interaction: Citizens Online: Considerations for Today and the Future, Computer-Human Interaction Special Interest Group (CHISIG) of Australia, 2005, 10 pgs.

* cited by examiner

620i

| Pixel | Layer | | | | | |
|---|---|---|---|---|---|---|
| | 1 | 2 | 3 | 4 | 5 | 6 |
| P01 | C10 | C01 | C08 | | | |
| P02 | C08 | | | | | |
| P03 | C08 | | | | | |
| P04 | C08 | | | | | |
| P05 | C08 | C01 | C08 | C03 | | |
| P06 | C08 | C03 | | | | |
| P07 | C08 | C03 | | | | |
| P08 | C03 | C01 | C08 | C03 | | |
| P09 | C08 | C03 | | | | |
| P10 | C08 | C03 | | | | |
| P11 | C08 | C03 | | | | |
| P12 | C08 | C03 | | | | |
| P13 | C04 | C01 | C08 | C03 | | |

| Pixel | Layer | | | | | |
|---|---|---|---|---|---|---|
| | 1 | 2 | 3 | 4 | 5 | 6 |
| P14 | C08 | C03 | | | | |
| P15 | C08 | C03 | | | | |
| P16 | C08 | C03 | | | | |
| P17 | C08 | | | | | |
| P18 | C03 | C01 | C08 | | | |
| P19 | C08 | | | | | |
| P20 | C05 | C01 | C08 | | | |
| P21 | C08 | | | | | |
| P22 | C08 | | | | | |
| P23 | C08 | | | | | |
| P24 | C04 | C01 | C08 | | | |
| P25 | C08 | | | | | |

*FIG. 6I*

| Pixel | Layer | | | | | |
|---|---|---|---|---|---|---|
| | 1 | 2 | 3 | 4 | 5 | 6 |
| P01 | C10 | C01 | C08 |  |  |  |
| P02 | C08 | C05 |  | C05 |  |  |
| P03 | C08 | C05 |  |  |  |  |
| P04 | C08 | C05 |  |  |  |  |
| P05 | C08 | C01 | C08 |  |  |  |
| P06 | C08 | C03 | C05 |  |  |  |
| P07 | C08 | C03 | C05 | C03 | C05 |  |
| P08 | C08 | C03 | C05 |  |  |  |
| P09 | C08 | C03 | C05 |  |  |  |
| P10 | C08 | C03 | C05 | C03 | C05 |  |
| P11 | C08 | C01 | C08 |  |  |  |
| P12 | C08 | C03 | C05 |  |  |  |
| P13 | C04 | C01 | C08 | C03 | C05 |  |
| P14 | C08 | C03 | C05 |  |  |  |
| P15 | C08 | C03 | C05 |  |  |  |
| P16 | C08 | C03 | C05 |  |  |  |
| P17 | C08 | C05 |  |  |  |  |
| P18 | C03 | C01 | C08 | C05 |  |  |
| P19 | C08 | C05 |  |  |  |  |
| P20 | C05 | C01 | C08 | C05 |  |  |
| P21 | C08 | C05 |  |  |  |  |
| P22 | C08 | C05 |  |  |  |  |
| P23 | C08 | C05 |  |  |  |  |
| P24 | C04 | C01 | C08 | C05 |  |  |
| P25 | C08 | C05 |  |  |  |  |

| Pixel | Layer | | | | | |
|---|---|---|---|---|---|---|
| | 1 | 2 | 3 | 4 | 5 | 6 |
| P01 | C10 | C01 | C08 | C05 | C07 | |
| P02 | C08 | C05 | C07 | | | |
| P03 | C08 | C05 | | | | |
| P04 | C08 | | | | | |
| P05 | C08 | C05 | C07 | C03 | C05 | C07 |
| P06 | C08 | C01 | C08 | C03 | | |
| P07 | C08 | C03 | C05 | | | |
| P08 | C03 | C03 | C05 | | | |
| P09 | C08 | C01 | C08 | C03 | C07 | |
| P10 | C08 | C03 | C05 | C05 | C07 | |
| P11 | C08 | C03 | C05 | C07 | | |
| P12 | C08 | C03 | C05 | | | |
| P13 | C04 | C01 | C08 | C03 | C05 | |

| Pixel | Layer | | | | | |
|---|---|---|---|---|---|---|
| | 1 | 2 | 3 | 4 | 5 | 6 |
| P14 | C08 | C03 | C05 | | | |
| P15 | C08 | C03 | C05 | | | |
| P16 | C08 | C03 | C05 | C07 | | |
| P17 | C08 | C03 | C05 | C05 | | |
| P18 | C03 | C01 | C08 | C05 | | |
| P19 | C08 | C05 | | | | |
| P20 | C05 | C01 | C08 | C05 | | |
| P21 | C08 | C05 | | | | |
| P22 | C08 | C05 | | | | |
| P23 | C08 | C05 | | | | |
| P24 | C04 | C01 | C08 | C05 | | |
| P25 | C08 | C05 | C07 | | | |

FIG. 6M

GRAPHIC COLOR-BASED AUTHENTICATION

BACKGROUND

The present invention generally relates to processing systems, and more specifically, to graphic color-based authentication.

Processing systems can be used to access secure or protected data. In order to access the secure or protected data, a user may be required to authenticate itself in order to be granted access. For example, the user enters a username and password to gain access to a secure portion of a website. Basic username and password authentication is common and easy to implement but can also be less secure than other authentication techniques. Some websites, applications, data stores, etc., implement more advanced authentication techniques. For example, a financial institution, an online medical chart, etc., can require multiple levels of authentication (i.e., multi-factor authentication) for a user to access secure or protected data. Multi-factor authentication requires that a user present multiple separate pieces of evidence to gain access to secure or protected data.

SUMMARY

Embodiments of the present invention are directed to a computer-implemented method for graphic color-based authentication. A non-limiting example of the computer-implemented method includes presenting, on a display of a user processing system, a graphic comprising a plurality of pixels. The method further includes enabling, by the user processing system, a user to associate a color with at least one of the plurality of pixels. The method further includes generating, by the user processing system, a passcode, the passcode being based at least in part on the color associated with the at least one of the plurality of pixels. The method further includes transmitting, by the user processing system, the passcode to a host processing system. The method further includes determining, by the host processing system, whether the passcode matches an expected passcode by comparing the passcode to the expected passcode, the expected passcode being based at least in part on a reference graphic comprising a plurality of reference pixels, each of the plurality of reference pixels having a color or a null value associated therewith. The method further includes, responsive to determining that the passcode matches the expected passcode, authorizing, by the host processing system, the user processing system to access a restricted resource.

Embodiments of the present invention are directed to a system. The system includes a user processing system configured to: present, on a display of the user processing system, a graphic comprising a plurality of pixels, enable a user to associate a color with at least one of the plurality of pixels, generate a passcode, the passcode being based at least in part on the color associated with the at least one of the plurality of pixels, and transmit the passcode to a host processing system. The system also includes the host processing system configured to: determine whether the passcode matches an expected passcode by comparing the passcode to the expected passcode, the expected passcode being based at least in part on a reference graphic comprising a plurality of reference pixels, each of the plurality of reference pixels having a color or a null value associated therewith, and, responsive to determining that the passcode matches the expected passcode, authorizing the user processing system to access a restricted resource.

Embodiments of the invention are directed to a computer program product. A non-limiting example of the computer program product includes a computer readable storage medium having program instructions embodied therewith. The program instructions are executable by a processor to cause the processor to perform a method for graphic color-based authentication.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 6C, 6E, 6G, 6I, 6K, 6M depict tables of the status of color associated with each pixel of the graphics of FIGS. 6B, 6D, 6F, 6H, 6J, 6L, respectively.

Figure 1:
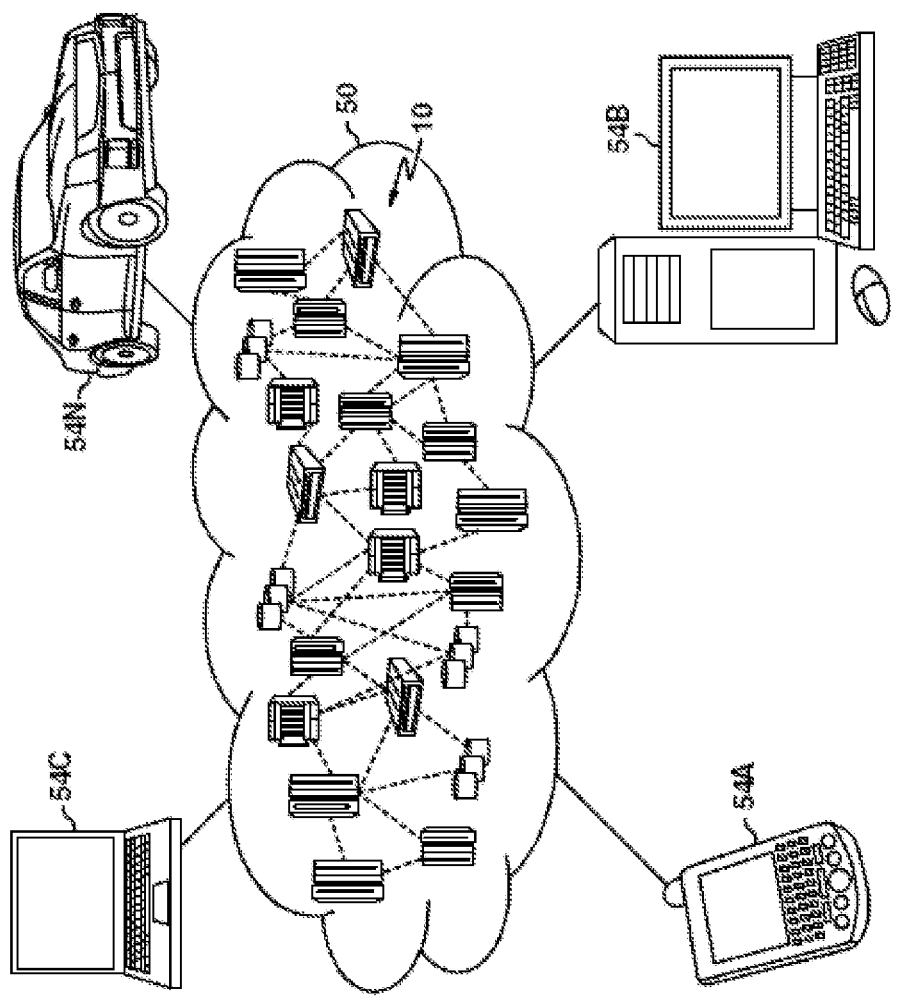
FIG. 1 depicts a cloud computing environment according to one or more embodiments described herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
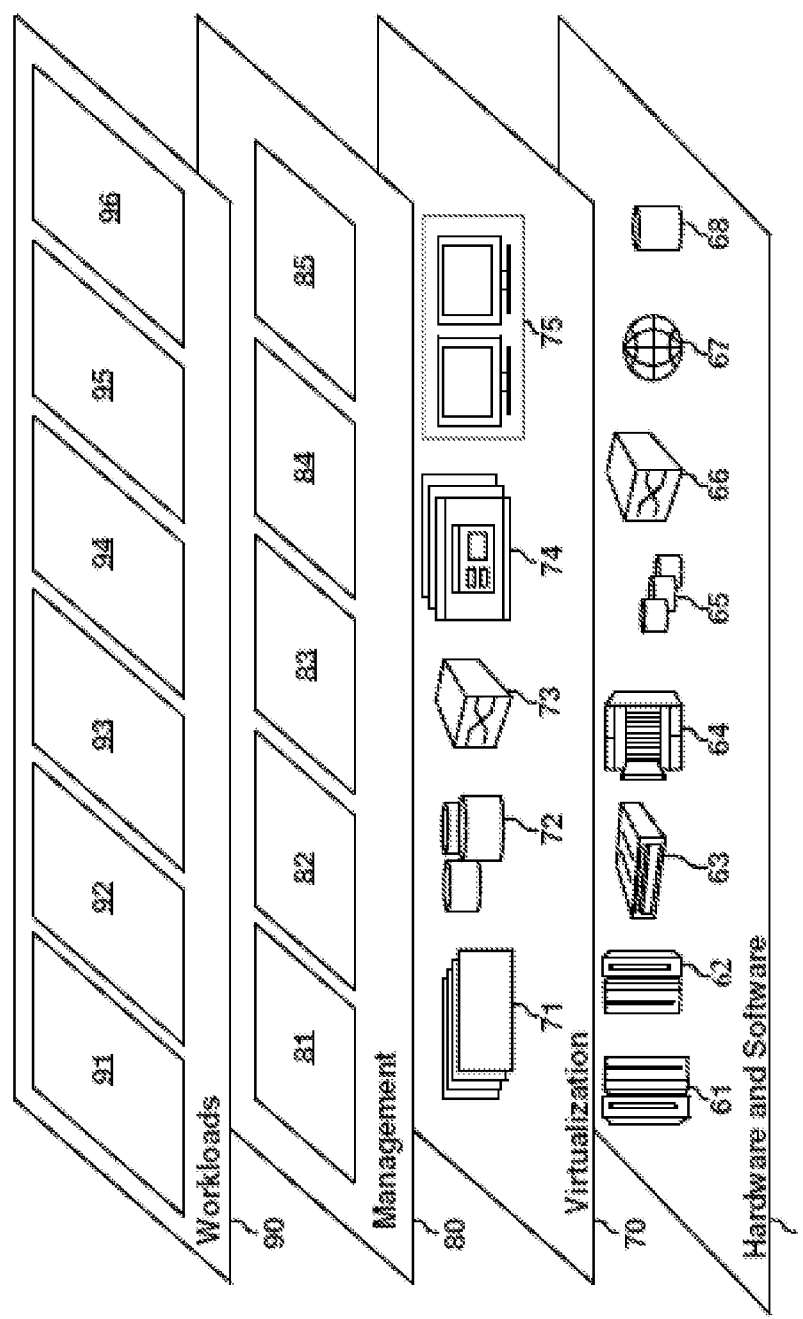
FIG. 2 depicts abstraction model layers according to one or more embodiments described herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and graphic color password-based authentication 96.

Figure 3:
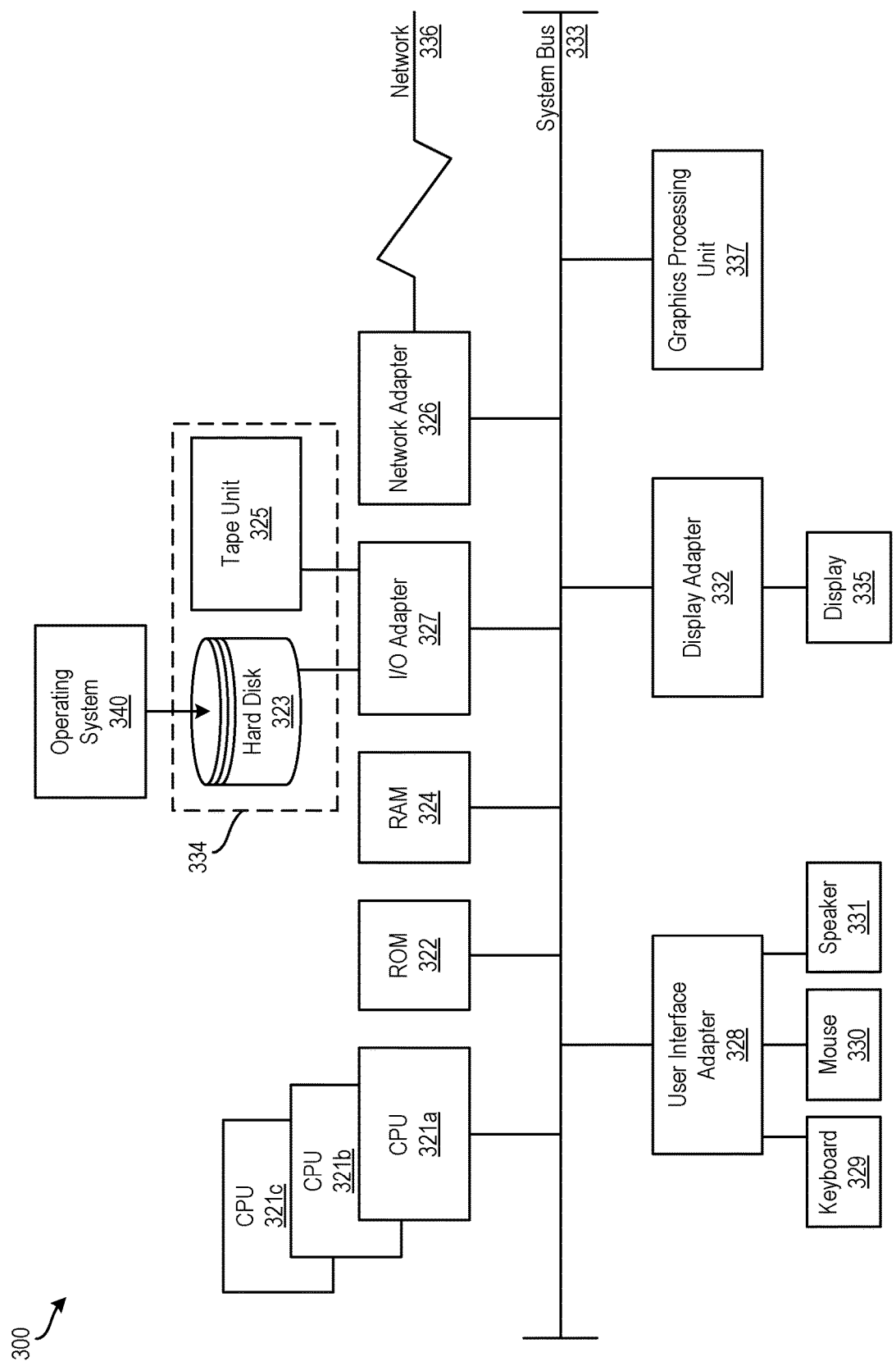
FIG. 3 depicts a block diagram of a processing system for implementing the presently described techniques according to one or more embodiments described herein.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, one or more processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a network adapter 326 coupled to system bus 333. I/O adapter 327 may be a small computer system interface (SCSI) adapter that communicates with a hard disk 323 and/or a tape unit 325 or any other similar component. I/O adapter 327, hard disk 323, and tape unit 325 are collectively referred to herein as mass storage 334. Operating system 340 for execution on processing system 300 may be stored in mass storage 334. The network adapter 326 interconnects system bus 333 with an outside network 336 enabling processing system 300 to communicate with other such systems.

A display (e.g., a display monitor) 335 is connected to system bus 333 by display adapter 332, which may include a graphics adapter to improve the performance of graphics intensive applications and a video controller. In one aspect of the present disclosure, adapters 326, 327, and/or 332 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Turning now to an overview of technologies that are more specifically relevant to aspects of the invention, the technical solutions described herein provide increased security for processing systems by utilizing graphic color-based authentication.

As processing systems become more powerful and efficient, it is becoming easier to crack or guess a passcode. Accordingly, it is desirable to increase the complexity of a passcode. Merely making longer passcodes may be difficult for a user to remember. Therefore, the present techniques use a graphic color-based authentication technique to generate highly secure, lengthy passcode strings, which the user does not have to remember. Instead, the user needs only remember how to visually color a graphic, which is then used to generate the passcode string used for authentication.

In particular, the present techniques use color layers of individual pixels (cells) of an image/graphic to create a highly secure authentication passcode. This concept has two main components as determining factors for authentication. The first includes a random fill of color pixels and null pixels—which are the absence of color, which has the same appearance to a user as the color white—in the first layer of individual pixels within an image. The second concept includes a second layer of white color in each pixel for pixels in which the first layer pixel was not a null pixel. The user will not be able to tell the difference between a white color or null color in a cell. The user will then fill in colors in individual layers of pixels either by image mode (all pixels selected), region mode (a group of pixels is selected), and/or pixels mode (individual pixels are selected). The accumulation of colors in individual pixel layers is used to perform authentication by comparing a passcode string generated from the pixel and associated color information against an expected/known passcode string.

The present techniques utilize a graphic that the user colors by pixel in individual pixel layers. This graphic is used to perform authentication. According to one or more embodiments described herein, authentication can require each layer of pixels to be colored in sequence. This causes the last visible layer to look the same for each authentication. According to one or more embodiments described herein, authentication can allow each layer of pixels to be colored out of sequence. This would allow the last visible layer to look different for each authentication. Authentication can also allow each pixel layer to be colored independently of other pixel layers and still remain in sequence.

Finally, a null color (the absence of color) and the color white have the same appearance, so they are not visually indistinguishable from each other.

Figure 4:
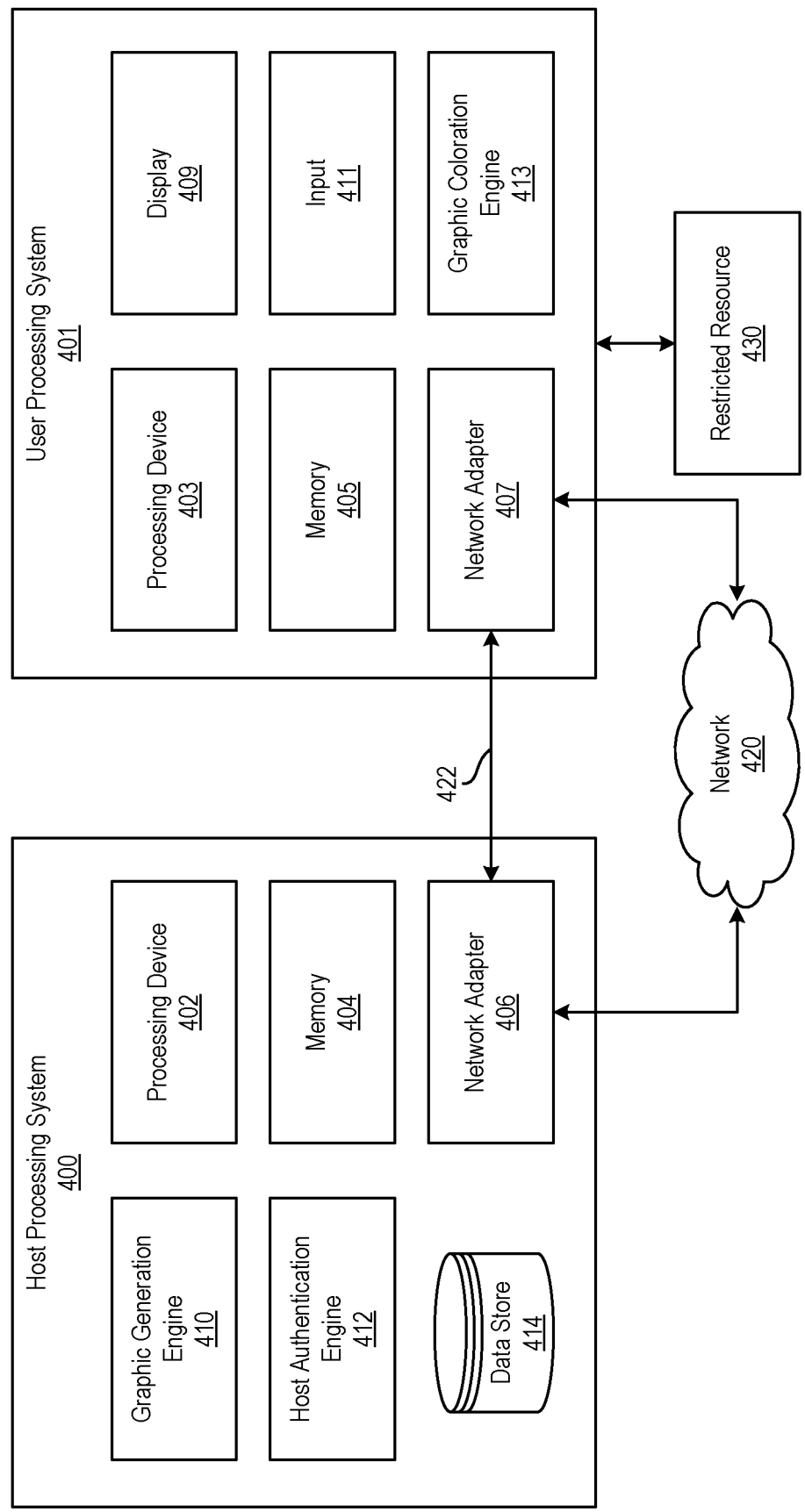
FIG. 4 depicts a block diagram of a host processing system and a user processing system for graphic color-based authentication according to one or more embodiments described herein.

Turning now to a more detailed description of aspects of the present invention, FIG. 4 depicts a block diagram of a host processing system 400 and a user processing system 401 for graphic color-based authentication according to one or more embodiments described herein. The host processing system 400 includes a processing device 402, a memory 404, a network adapter 406, a graphic generation engine 410, a host authentication engine 412, and a data store 414. The user processing system 401 includes a processing device 403, a memory 405, a network adapter 407, a display 409, an input 411, and a graphic coloration engine 413. It should be appreciated that the host processing system 400 can be implemented in a cloud computing environment, such as the cloud computing environment 50.

The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include a processor (e.g., the processing device 402, the processing device 403, etc.) for executing those instructions. Thus a system memory (e.g., the memory 404, the memory 405, etc.) can store program instructions that when executed by the processing device 402 implement the engines described herein. Other engines can also be utilized to include other features and functionality described in other examples herein.

Figure 5:
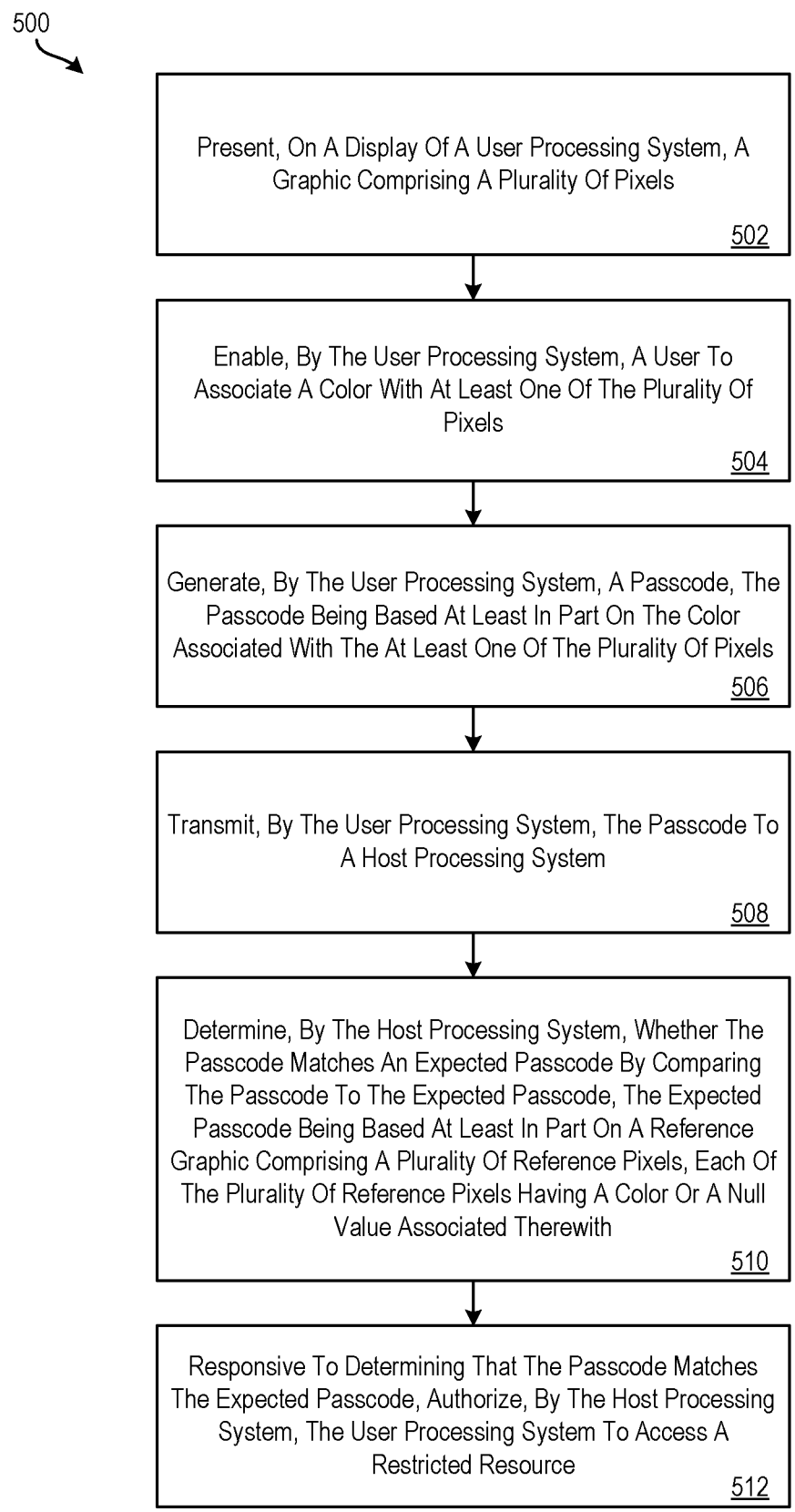
FIG. 5 depicts a flow diagram of a method for graphic color-based authentication according to one or more embodiments described herein.

The features and functionality of the host processing system 400 and the user processing system 401 (and their respective components, modules, engines, etc.) are described in more detail with respect to FIG. 5. In particular, FIG. 5 depicts a flow diagram of a method 500 for graphic color-based authentication according to one or more embodiments described herein. The method 500 can be implemented by any suitable processing system (e.g., the cloud computing environment 50, the processing system 300, the host processing system 400, the user processing system 401, etc.) or processing device (e.g., the processing device 321, the processing device 402, the processing device 403, etc.) and suitable combinations thereof.

At block 502, a graphic (e.g., the graphic 601a of FIG. 6A) is displayed on the display 409 of the user processing system 401. The graphic includes a plurality of pixels (e.g., pixels 610 of the graphic 601a of FIG. 6A). According to one or more embodiments described herein, a first subset of the plurality of pixels are grouped into a first region and a second subset of the plurality of pixels are grouped into a second region. The graphic can also include one or more layers of pixels. A pixel from a first layer is overlaid over a pixel in the same location on a second layer.

According to one or more embodiments described herein, prior to the graphic 601a being displayed on the display 409 of the user processing system 401, the graphic generation engine 410 generates the graphic. According to one or more embodiments described herein, a service provider colors a first layer of the graphic 601a with random colors including a mixture of color and null pixels. Null pixels are blank pixels with no color associated therewith and data is not transmitted for these pixels. This provides a final length of the passcode string (described below) varies each time an authentication is attempted.

At block 504, the graphic coloration engine 413 of the user processing system 401 enables a user to associate a color with at least one of the plurality of pixels of the graphic 601a. For example, the user selects a color from a color pallet (e.g., a color pallet 602 of FIG. 6A). The user then selects one (or more) of the pixels to cause the pixel to change colors. In this way, the color is associated with the pixel. The user can associate the color with the pixel/pixels using the input 411 of the user processing system 401. The input 411 can include a touchscreen, mouse, keyboard, trackpad, touchpad, stylus, and/or other input.

At block 506, the user processing system 401 generates a passcode. The passcode is based at least in part on the color associated with the at least one of the plurality of pixels. For example, the passcode is a string of characters comprising an identifier for each of the plurality of pixels and at least one color indicator associated with each of the at least one of the plurality of pixels.

At block 508, the user processing system 401 transmits the passcode to the host processing system 400. For example, the user processing system 401 transmits, using the network adapter 407, the passcode to the host processing system 400, which receives the passcode via the network adapter 406. It should be appreciated that the network adapters 406, 407 are any suitable network adapter or other communications adapter to enable the transmission and receipt of data, such as over a network 420 and/or via a direct link 422 between the network adapters 406, 407. The network 420 can be any suitable communication network, such as an intranet, the internet, a local area network, a wide area network, a wireless network, a peer-to-peer network, and the like, and suitable combinations thereof.

At block 510, the host authentication engine 412 of the host processing system 400 determines whether the passcode matches an expected passcode by comparing the passcode to the expected passcode. The expected passcode is an expected (or known) string of characters comprising an identifier for each of the plurality of pixels and at least one color indicator associated with each of the at least one of the plurality of pixels. The expected passcode is based at least in part on a reference graphic comprising a plurality of reference pixels, each of the plurality of reference pixels having a color or a null value associated therewith. The reference graphic can be automatically generated by the graphic generation engine 410 and/or created by the user. The expected passcode can be stored, for example, in the data store 414.

At block 512, the host authentication engine 412 of the host processing system 400 authenticates the user processing system 401 to access a restricted resource 430 when it is determined that the passcode matches the expected passcode. For example, the host processing system 400 transmits, via the network 420 and/or the direct link 422, an authentication command to the user processing system 401 to enable the user processing system 401 to access the restricted resource 430.

Additional processes also may be included, and it should be understood that the process depicted in FIG. 5 represents an illustration, and that other processes may be added or existing processes may be removed, modified, or rearranged without departing from the scope and spirit of the present disclosure.

Figure 6A:
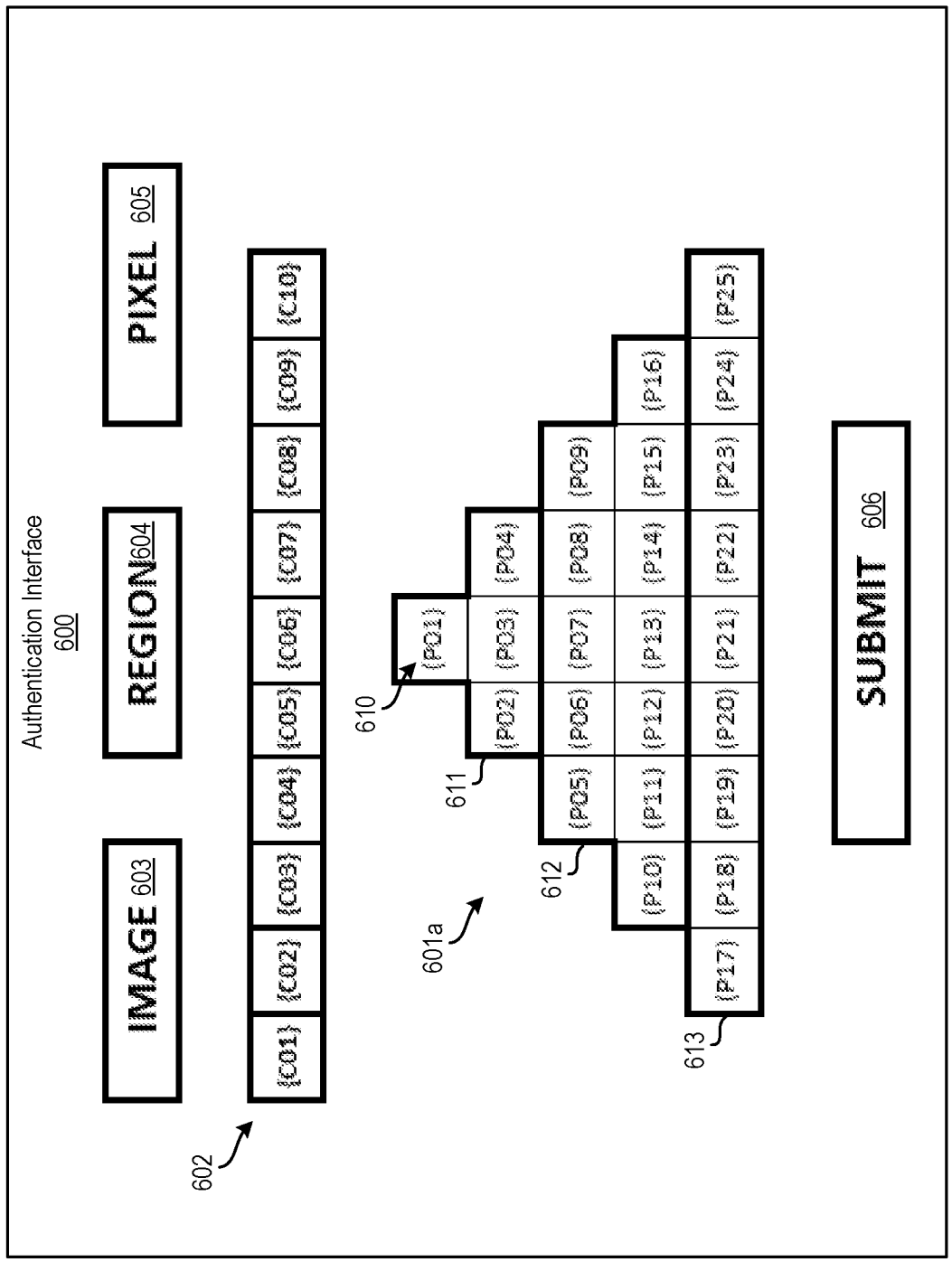
FIGS. 6A, 6B, 6D, 6F, 6H, 6J, 6L depict graphics used for graphic color-based authentication presented on an authentication interface according to one or more embodiments described herein.

FIG. 6A depicts an authentication interface 600 for presenting a graphic 601a used for graphic color-based authentication according to one or more embodiments described herein. The authentication interface 600 includes the graphic 601a, a color pallet 602, an image selection button 603, a region selection button 604, a pixel selection button 605, and a submit button 606.

The graphic 601a includes a plurality of pixels 601a, designated as P01, P02, P03, P04, P05, P06, P07, P08, P09, P10, P11, P12, P13, P14, P15, P16, P17, P18, P19, P20, P21, P22, P23, P24, and P25. Each of the pixels can be assigned a color attribute as described further herein, the colors being selected from the color pallet 602. In the example shown in FIG. 6A, the color pallet 602 includes ten colors, designated as C01, C02, C03, C04, C05, C06, C07, C08, C09, C10, although other numbers of colors can be used. As an example, the color C01 is "white," the color C02 is "dark red," the color C3 is "orange," the color C4 is "yellow," the color C5 is "light green," the color C7 is "bright green," the color C8 is "light blue," the color C09 is "bright blue," and the color C10 is "purple."

According to one or more embodiments described herein, the graphic 601a can be colored in its entirety by selecting the image selection button 603. For example, a user selects the image selection button 603, selects a color from the color pallet 602 (e.g., C05), then selects one of the pixels 610 of the graphic 601a. In such case, the entire graphic 601a (i.e., each of the cells P01-P25) of the graphic 601a becomes the color selected from the color pallet 602 (e.g., C05).

According to one or more embodiments described herein, the graphic 601a can also be colored by region 611, 612, 613, which are depicted in FIG. 6A by bold lines. Each region 611, 612, 613 includes multiple of the pixels 610 of the graphic 601a. For example, the region 611 includes pixels P01-P04, the region 612 includes pixels P05-P16, and the region 613 includes the pixels P17-P25. In an example, a user selects the region selection button 604, selects a color from the color pallet 602 (e.g., C07), then selects one of the pixels 610 of a region 611, 612, 613 of the graphic 601a. In such case, the entire region of the graphic 601a becomes the color selected from the color pallet 602 (e.g., C07). For example, if P07 is the selected pixel and C07 is the selected color, each of the pixels P05-P16 of the region 612 becomes the selected color (e.g., C07). The pixels of the regions 611 and 613 are unaffected by the change to the color of the pixels of the region 612.

According to one or more embodiments described herein, the graphic 601a can also be colored by individual pixel 610. Each of the pixels 610 (e.g., P01-P25). In an example, a user selects the pixel selection button 605, selects a color from the color pallet 602 (e.g., C02), then selects one of the pixels 610 of the graphic 601a. In such case, the only the selected pixel of the graphic 601a becomes the color selected from the color pallet 602 (e.g., C02). For example, if P15 is the selected pixel and C02 is the selected color, the pixel P15 becomes the selected color (e.g., C02). The other pixels (e.g., P01-P14 and P16-P25) of the graphic 601a are unaffected by the change to the color of the pixel P15.

According to one or more embodiments described herein, the graphic 601a includes multiple layers of color for each pixel; however, it is the top layer of the image (the last layer colored by the user) of each pixel is visible to the user.

A submit button 606 enables a user to submit the graphic 601a once appropriate coloring of the graphic 601a is performed. Upon submission, the host processing system 400 can perform authentication to determine whether to grant access to the restricted resource 430 for the user processing system 401.

It should be appreciated that the pixel numbers (e.g., P1, P7, P20, etc.) and color numbers (e.g., C01, C04, C07, etc.) are not shown to the user; however, for illustration purposes, this information is shown in the figures for explanatory purposes.

Figure 6B:
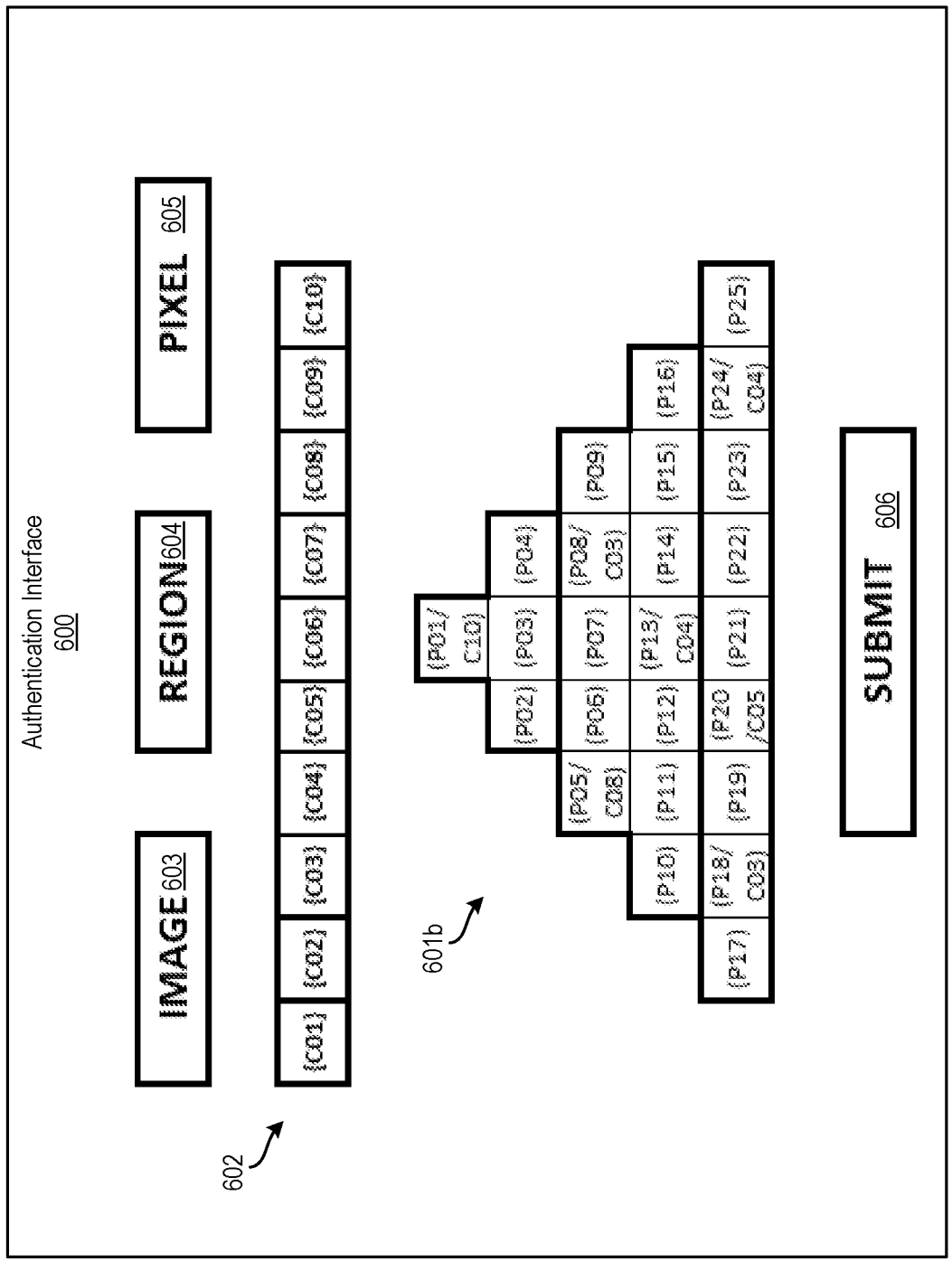
Figure 6C:
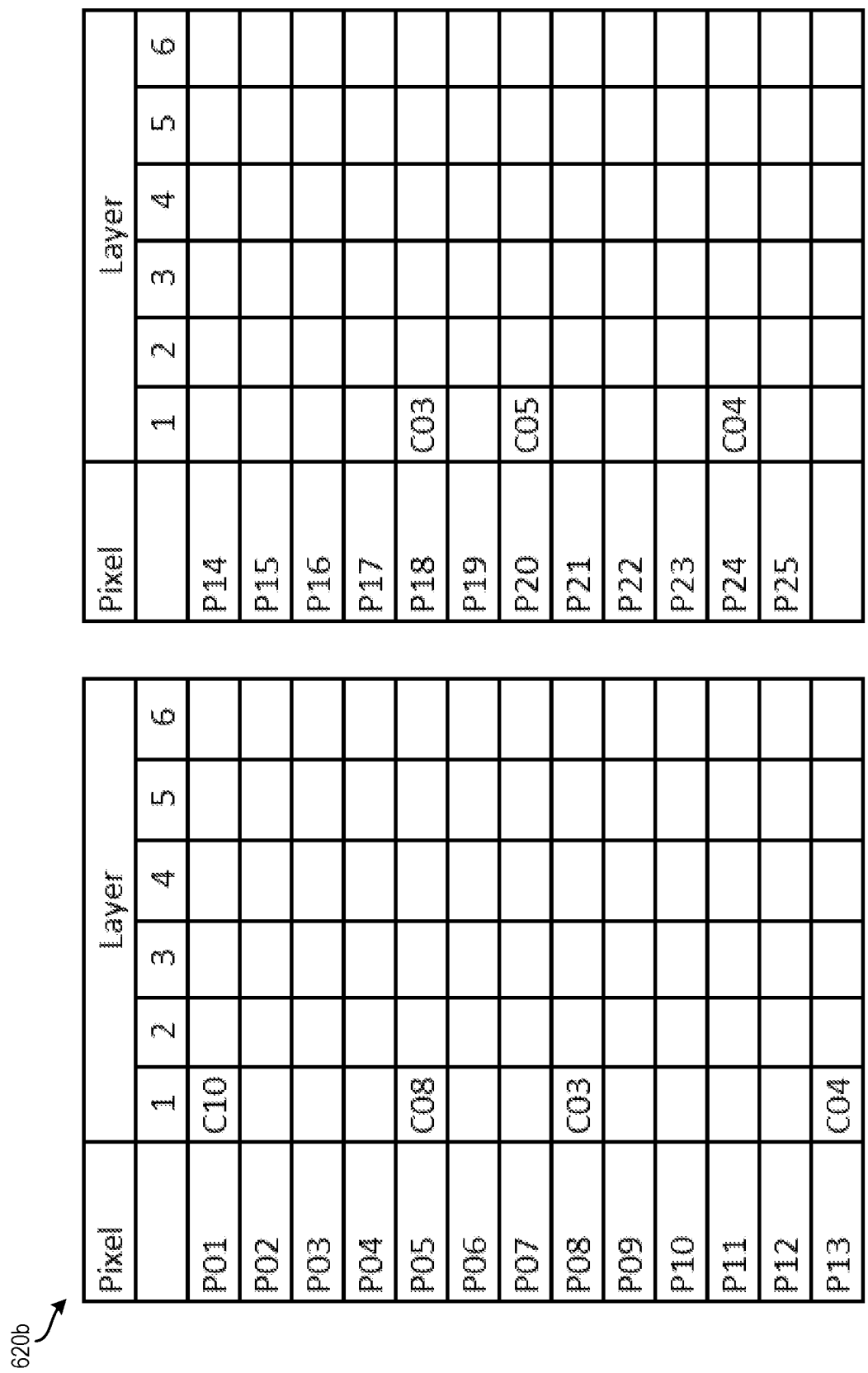

FIG. 6B depicts the authentication interface 600 for presenting a graphic 601b used for graphic color-based authentication according to one or more embodiments described herein. In this figure, a service provider, via the graphic generation engine 410, has input colors on a first layer of pixels 610 of the graphic 601b as shown. The pixels 610 without color are null pixels, so they remain at the first layer since no color has been added. Null pixels are not identified in the passcode string. The table 620b shown in FIG. 6C depicts the status of the color associated with each pixel of the graphic 601b.

Figure 6D:
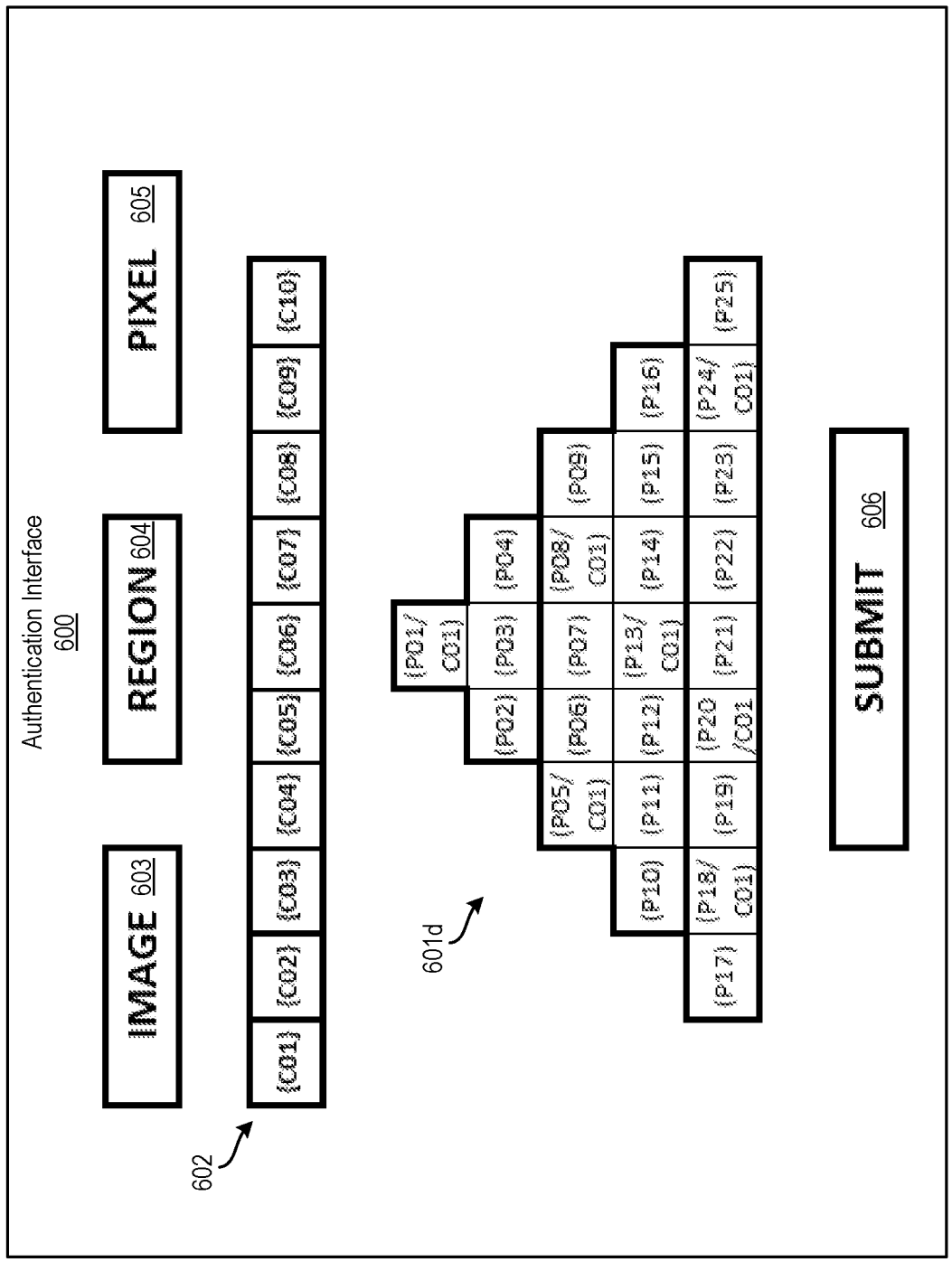
Figure 6E:
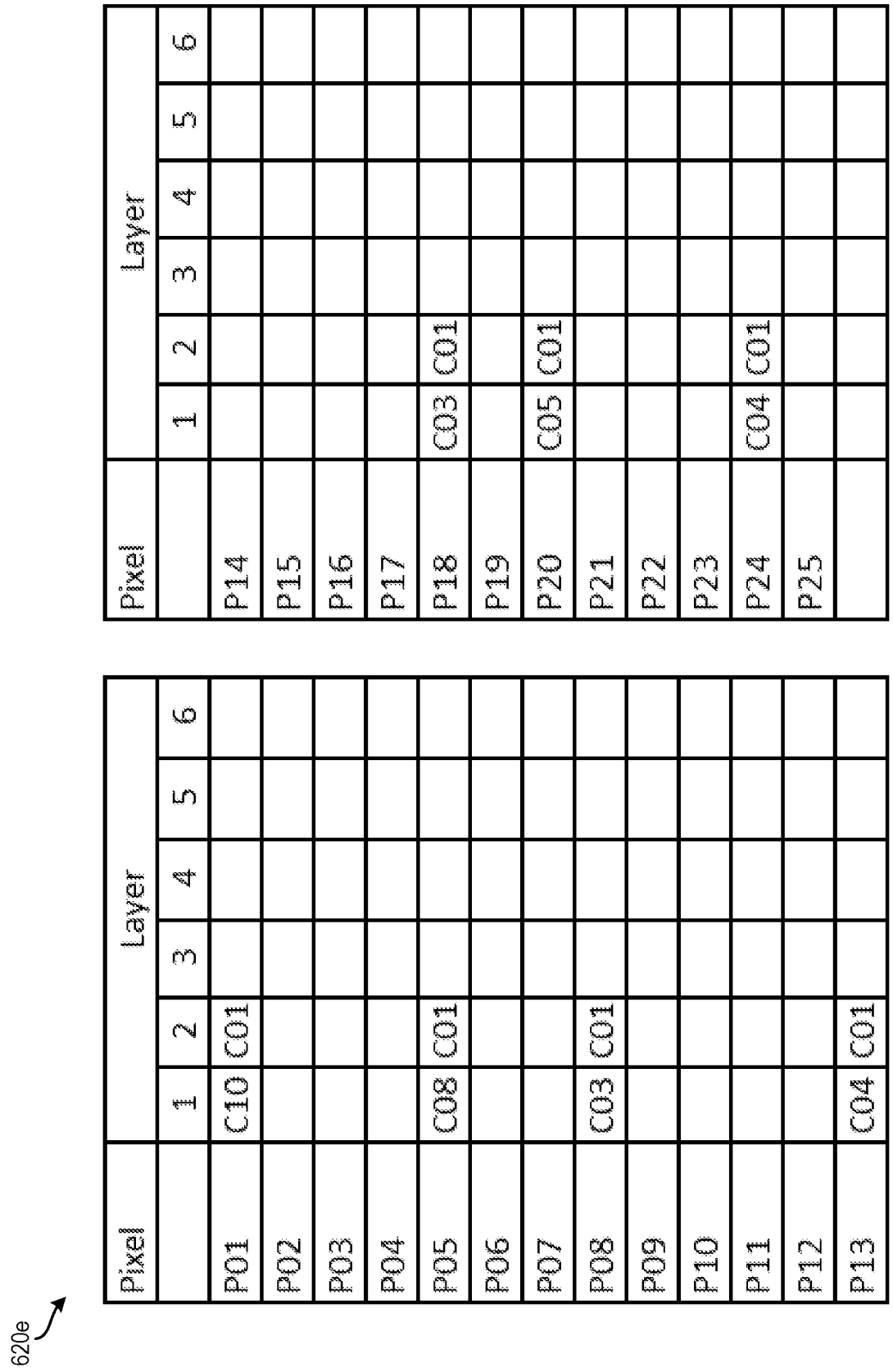

In order to make the image easier to work with for the user, the service provider now places the color white (e.g., C01) into each pixel 610 where color was previously assigned. The null pixels are not changed, but since the null pixels default to the white color, the entire graphic 600d now appears white to the user as shown in FIG. 6D. The table 620e of FIG. 6E depicts the status of the color assignments after this step.

Figure 6F:
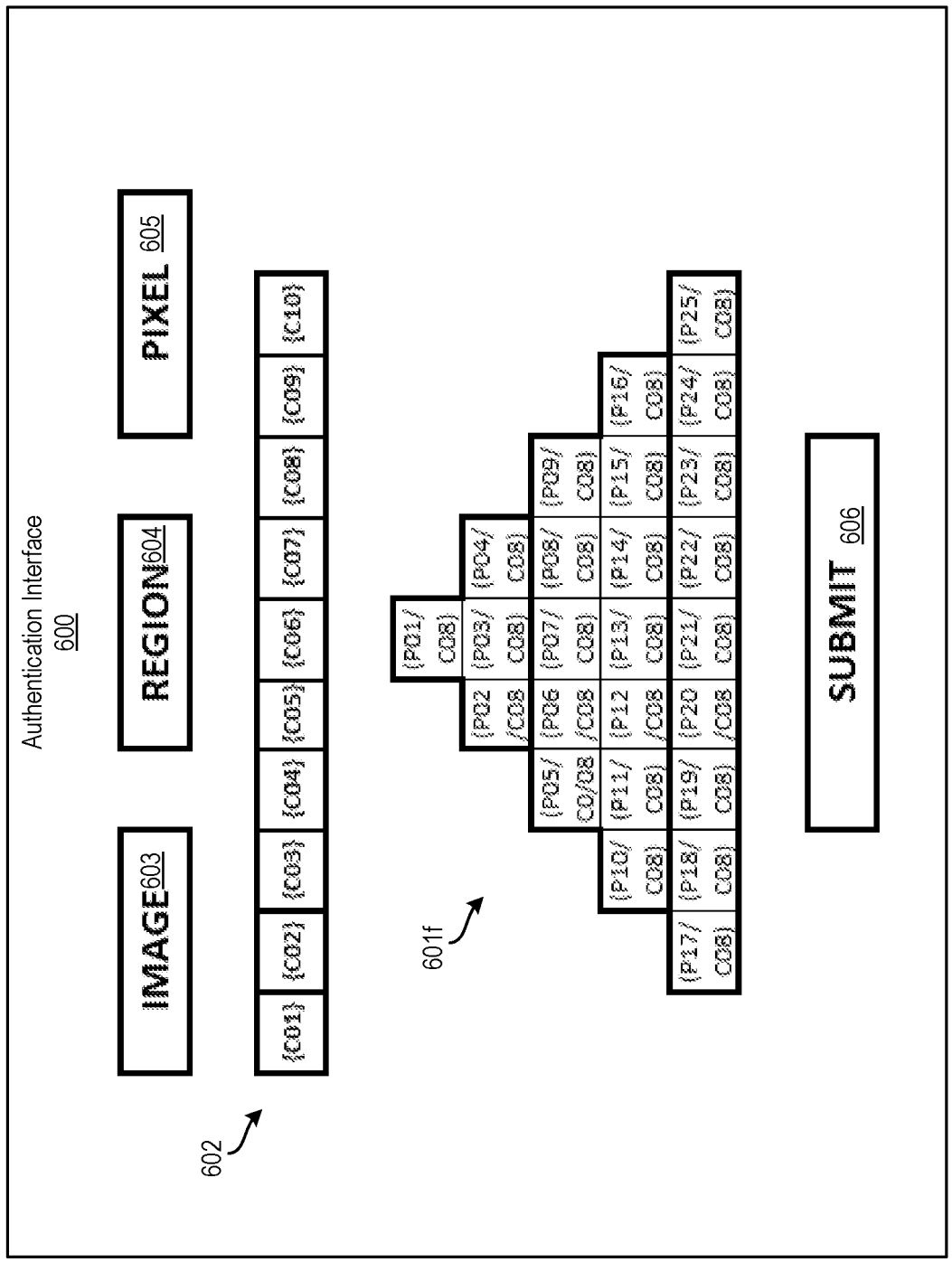
Figure 6G:
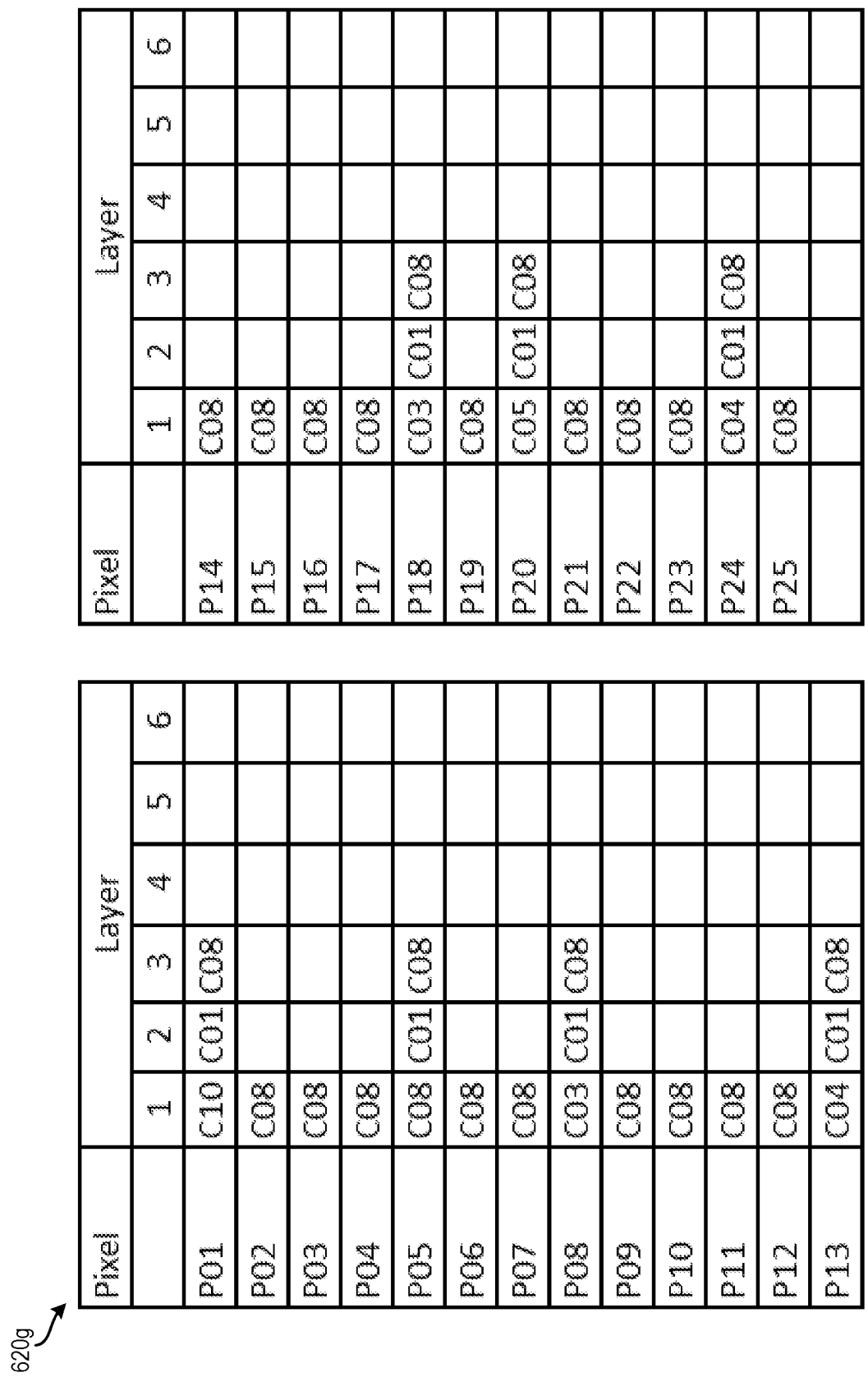

At this point, the user is now ready to "paint" the graphic following the pattern that is already associated with the user (i.e., the reference graphic). As described above, the graphic 601b is presented to the user to enable the user to associate a color with at least one of the pixels 610. A pattern can either be laid down in random order or in sequence by layer of the individual pixels. Based on the sequence mode, the user then selects the image selection button 603 and then touches color (e.g., the color C08). The entire graphic 601f turns to color C08 as shown in the example of FIG. 6F. The table 620g of FIG. 6G depicts the status of the color assignments after this step. It should be appreciated that each pixel 610 is not at the same layer. This is because each pixel has layers that are independent of the other pixels. The visual layer (top layer of the image) is the outer most layer (highest number) of each pixel as shown in the table 620g associated with the graphic 601f.

Figure 6H:
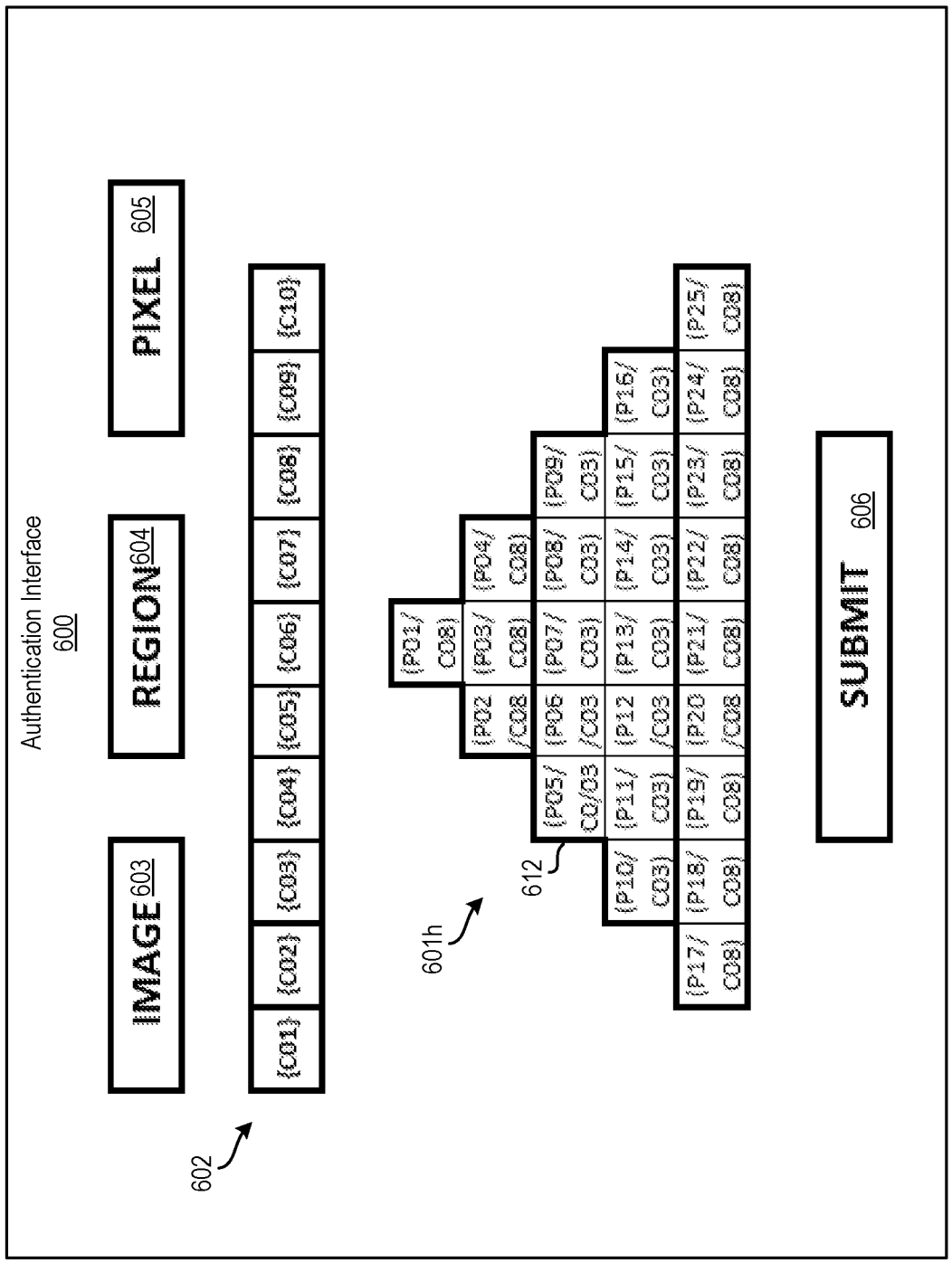

The user then selects the region selection button 604 and then selects one of the pixels 610 in the region 612. The user then selects the color C03, and the region 612 then changes to color C03 as shown in the graphic 601h of FIG. 6H. The table 620i of FIG. 6I depicts the status of the color assignments after this step.

Figure 6J:
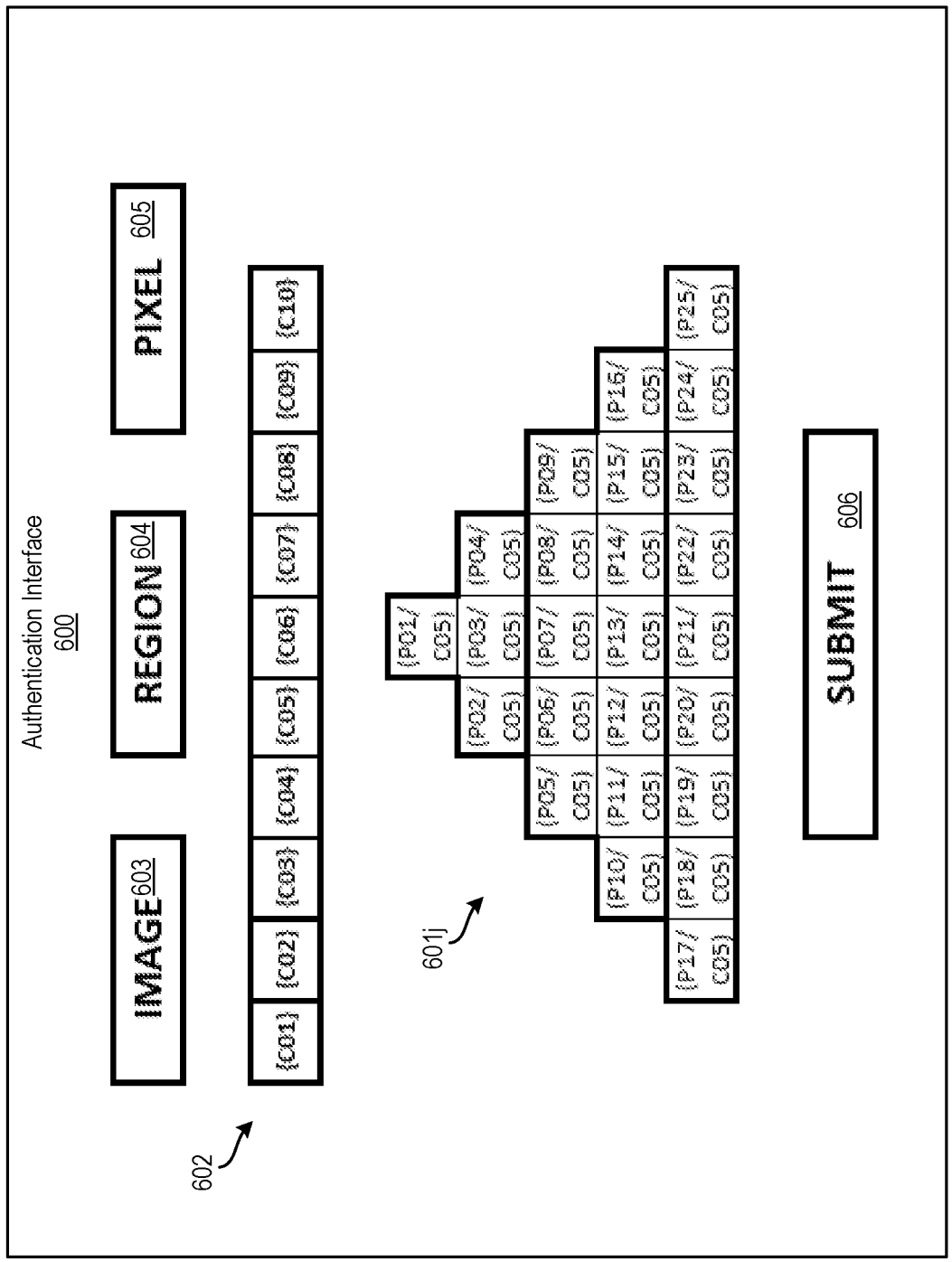

The user then selects the image selection button 603 and selects another color (e.g., the color C05). The entire graphic 601j then changes to color C05 as shown in FIG. 6J. The table 620k of FIG. 6K depicts the status of the color assignment after this step.

Figure 6L:
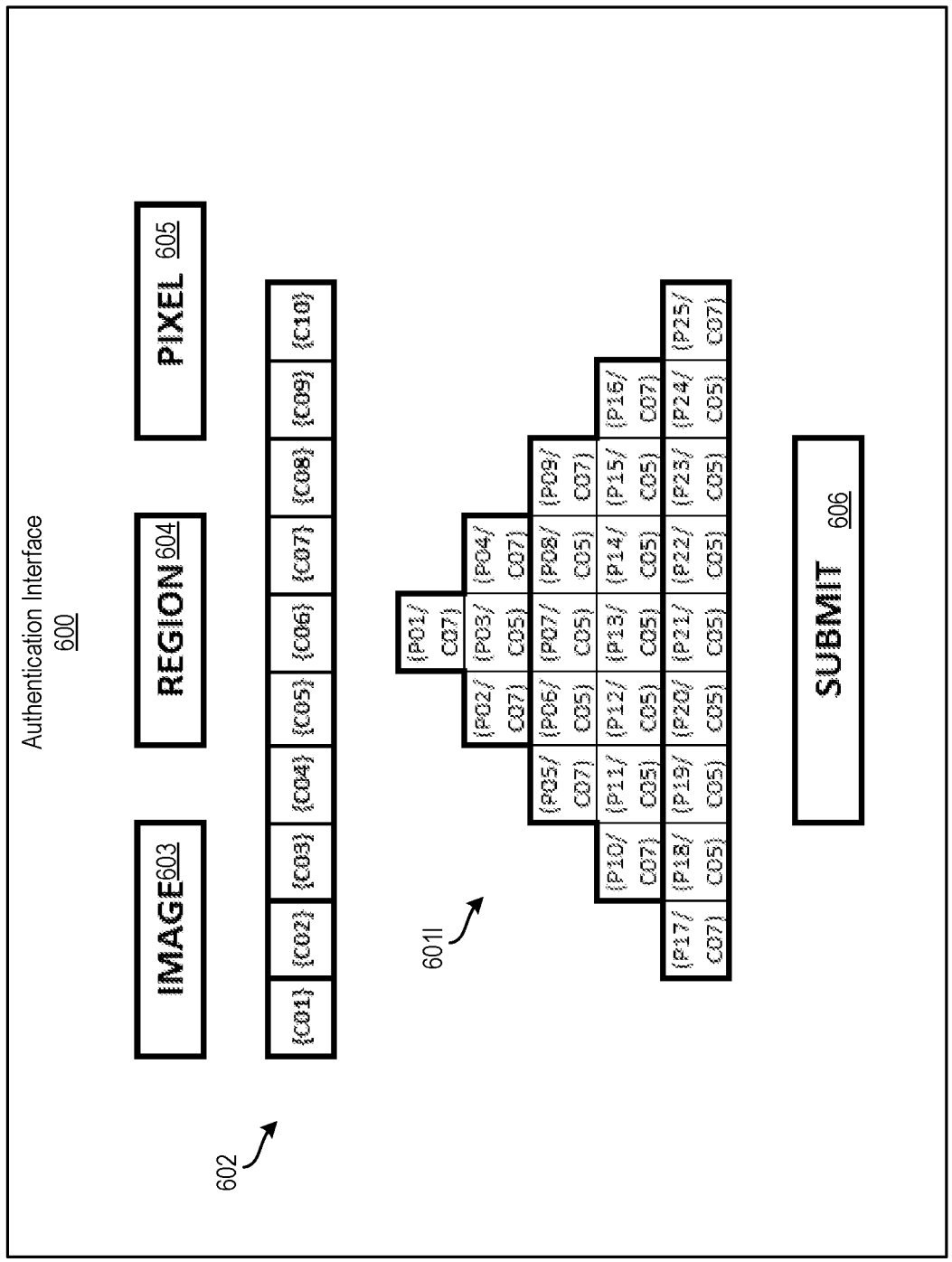

The user then selects the pixel selection button 605, multi-selects on the left and right edges of the graphic 601j of FIG. 6J, and then selects another color (e.g., the color C07). The graphic 601j changes as shown in the graphic 601l as shown in FIG. 6L. The table 620m of FIG. 6M shows the status of the color assignments in this step. In this example, this is the final step before authentication.

The user then selects the submit button 606. The user processing system 401 then generates a passcode string from the table 620m of FIG. 6M. Each pixel number is included in the string in order along with the color numbers associated with each pixel following the pixel number in each layer.

The following is an example of a passcode string where each individual pixel layer is in the sequence shown in the table 620m:
"P01C10C01C08C05C07P02C08C05C07P03C08C05 . . . P25C08C05C07." The following represents another example of a passcode string where each layer is not in the sequence based on the same authentication example using the table 620m:
"P01C10C01C05C07C08P02C05C07C08P03C05C08 . . . P25C05C07C08."

The user processing system 401 transmits the passcode string to the host processing system 400, which then performs authentication using the host authentication engine 412 by comparing the received passcode string to an expected passcode string (e.g., a passcode string stored in the data store 414, which was created during an initial passcode set up by the user). If the passcode strings match, the user processing system 401 is granted access to a restricted resource 430. If not, the restricted resource 430 remains restricted with respect to the user processing system 401. Additional authentication attempts can be made.

The graphic color-based authentication techniques provided herein have many advantages over existing approaches to authenticating access to a restricted resource. For example, an image that the user colors by pixel in individual pixel layers is used as the main determining factor for authentication. This allows the user to "paint" the graphic in a way that they can easily remember while creating an extremely high level of security.

Consider as an example that there are 25 pixels in a graphic and 4 possible colors in a color pallet. If the user paints each pixel with just one layer of color, the odds of a "hack" of the passcode is $(1/4)^{25}=1/1125899906842624$. Adding a second layer to the pixels in any order with the same four colors increases the odds of a "hack" of the passcode to $(1/(4+3+2+1))^{25}=1.0E+25$. Adding a second layer of pixels in which sequence is required in each individual pixel increases the odds of a "hack" of the passcode to $(1/4*1/4)^{25}=1/1.2676506002282E+30$. The odds of a hack increase substantially when more colors, more image pixels, and more individual pixel layers are used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for graphic color-based authentication, the method comprising:
   presenting, on a display of a user processing system, a graphic comprising a plurality of pixels;
   enabling, by the user processing system, a user to associate a color with at least one of the plurality of pixels, wherein enabling the user to associate the color with the at least one of the plurality of pixels comprises:
      presenting, on the display of the user processing system, a color pallet to the user;
      receiving, from the user, a selection of the color from the color pallet; and
      receiving, from the user, a selection of the at least one of the plurality of pixels, the selection causing the pixel to change to the color;
   subsequent to the user associating the color with the at least one of the plurality of pixels, generating, by the user processing system, a passcode, the passcode being based at least in part on the color associated with the at least one of the plurality of pixels, wherein the passcode is a string of characters comprising an identifier for each of the plurality of pixels and at least one color indicator associated with each of the at least one of the plurality of pixels;

transmitting, by the user processing system, the passcode to a host processing system;

determining, by the host processing system, whether the passcode matches an expected passcode by comparing the passcode to the expected passcode, the expected passcode being based at least in part on a reference graphic comprising a plurality of reference pixels, each of the plurality of reference pixels having a color or a null value associated therewith; and responsive to determining that the passcode matches the expected passcode, authorizing, by the host processing system, the user processing system to access a restricted resource.

2. The computer-implemented method of claim 1, wherein a first subset of the plurality of pixels are grouped into a first region, wherein a second subset of the plurality of pixels are grouped into a second region.

3. The computer-implemented method of claim 1, further comprising, prior to presenting the graphic, enabling the user to generate the reference graphic.

4. The computer-implemented method of claim 1, further comprising, prior to presenting the graphic, automatically generating the reference graphic by the host processing system.

5. The computer-implemented method of claim 1, further comprising generating, by the user processing system, a table comprising a status of the color associated with each pixel of the graphic.

6. The computer-implemented method of claim 1, wherein at least one of the plurality of pixels comprises two layers.

7. The computer-implemented method of claim 1, wherein a first pixel of the plurality of pixels comprises a first layer and a second layer, wherein a second pixel of the plurality of pixels comprises a third layer and a fourth layer, wherein the first layer and the second layer are independent from the third layer and the fourth layer.

8. A system comprising:
a user processing system configured to:
present, on a display of the user processing system, a graphic comprising a plurality of pixels,
enable a user to associate a color with at least one of the plurality of pixels, wherein enabling the user to associate the color with the at least one of the plurality of pixels comprises:
presenting, on the display of the user processing system, a color pallet to the user;
receiving, from the user, a selection of the color from the color pallet; and
receiving, from the user, a selection of the at least one of the plurality of pixels, the selection causing the pixel to change to the color;
subsequent to the user associating the color with the at least one of the plurality of pixels, generate a passcode, the passcode being based at least in part on the color associated with the at least one of the plurality of pixels, wherein the passcode is a string of characters comprising an identifier for each of the plurality of pixels and at least one color indicator associated with each of the at least one of the plurality of pixels, and
transmit the passcode to a host processing system; and
the host processing system configured to:
determine whether the passcode matches an expected passcode by comparing the passcode to the expected passcode, the expected passcode being based at least in part on a reference graphic comprising a plurality of reference pixels, each of the plurality of reference pixels having a color or a null value associated therewith, and
responsive to determining that the passcode matches the expected passcode, authorizing the user processing system to access a restricted resource.

9. The system of claim 8, wherein a first subset of the plurality of pixels are grouped into a first region, wherein a second subset of the plurality of pixels are grouped into a second region.

10. The system of claim 8, wherein the user processing system is further configured to, prior to presenting the graphic, enable the user to generate the reference graphic.

11. The system of claim 8, wherein the host processing system is further configured to, prior to presenting the graphic, automatically generate the reference graphic by the host processing system.

12. The system of claim 8, wherein the user processing system is further configured to generate a table comprising a status of the color associated with each pixel of the graphic.

13. The system of claim 8, wherein at least one of the plurality of pixels comprises two layers.

14. The system of claim 8, wherein a first pixel of the plurality of pixels comprises a first layer and a second layer, wherein a second pixel of the plurality of pixels comprises a third layer and a fourth layer, wherein the first layer and the second layer are independent from the third layer and the fourth layer.

15. A computer program product comprising:
a computer readable storage medium having program instructions embodied therewith, the program instructions executable by a processing device to cause the processing device to perform a method for graphic color-based authentication, the method comprising:
presenting, on a display of a user processing system, a graphic comprising a plurality of pixels;
enabling, by the user processing system, a user to associate a color with at least one of the plurality of pixels, wherein enabling the user to associate the color with the at least one of the plurality of pixels comprises:
presenting, on the display of the user processing system, a color pallet to the user;
receiving, from the user, a selection of the color from the color pallet; and
receiving, from the user, a selection of the at least one of the plurality of pixels, the selection causing the pixel to change to the color;
subsequent to the user associating the color with the at least one of the plurality of pixels, generating, by the user processing system, a passcode, the passcode being based at least in part on the color associated with the at least one of the plurality of pixels, wherein the passcode is a string of characters comprising an identifier for each of the plurality of pixels and at least one color indicator associated with each of the at least one of the plurality of pixels;
transmitting, by the user processing system, the passcode to a host processing system;

determining, by the host processing system, whether the passcode matches an expected passcode by comparing the passcode to the expected passcode, the expected passcode being based at least in part on a reference graphic comprising a plurality of reference pixels, each of the plurality of reference pixels having a color or a null value associated therewith; and responsive to determining that the passcode matches the expected passcode, authorizing, by the host processing system, the user processing system to access a restricted resource.

16. The computer program product of claim 15, wherein a first subset of the plurality of pixels are grouped into a first region, wherein a second subset of the plurality of pixels are grouped into a second region.

17. The computer program product of claim 15, further comprising, prior to presenting the graphic, enabling the user to generate the reference graphic.

* * * * *